(12) United States Patent
Feher et al.

(10) Patent No.: US 8,266,910 B2
(45) Date of Patent: Sep. 18, 2012

(54) SYSTEM AND METHOD FOR CHANGING THE EFFICIENCY OF A COMBUSTION TURBINE

(75) Inventors: Peter Feher, Suwanee, GA (US); Abbas Motakef, Duluth, GA (US)

(73) Assignee: General Electric Company, Schenectady, NY (US)

( * ) Notice: Subject to any disclaimer, the term of this patent is extended or adjusted under 35 U.S.C. 154(b) by 966 days.

(21) Appl. No.: 12/257,731

(22) Filed: Oct. 24, 2008

(65) Prior Publication Data
US 2010/0101209 A1  Apr. 29, 2010

(51) Int. Cl.
*F02C 1/00*  (2006.01)
(52) U.S. Cl. ........................... 60/728; 60/39.182
(58) Field of Classification Search ............... 60/39.182, 60/39.24, 795, 39.093, 728, 782, 785, 39.511, 60/39.53, 39.23, 779
See application file for complete search history.

(56) References Cited

U.S. PATENT DOCUMENTS

| | | | |
|---|---|---|---|
| 4,267,692 A | | 5/1981 | Earnest |
| 4,308,993 A | | 1/1982 | Buss |
| 5,339,620 A | * | 8/1994 | Ikeda et al. .................. 60/773 |
| 5,560,195 A | | 10/1996 | Anderson et al. |
| 6,027,304 A | | 2/2000 | Arar et al. |
| 6,169,332 B1 | | 1/2001 | Taylor et al. |
| 7,343,746 B2 | * | 3/2008 | Pierson ........................... 60/772 |
| 7,424,360 B1 | * | 9/2008 | Munson, Jr. ................... 701/100 |
| 7,644,573 B2 | * | 1/2010 | Smith et al. ................ 60/39.182 |
| 2007/0271929 A1 | * | 11/2007 | Berry .............................. 60/782 |

FOREIGN PATENT DOCUMENTS

| | | |
|---|---|---|
| DE | 3002615 A1 | 6/1981 |
| EP | 1063402 A2 | 12/2000 |
| EP | 2105598 A2 | 9/2009 |
| GB | 2364553 A | 1/2002 |

OTHER PUBLICATIONS

Search Report from corresponding EP Application No. 09173219.8, Jun. 9, 2011.

* cited by examiner

*Primary Examiner* — Phutthiwat Wongwian
(74) *Attorney, Agent, or Firm* — Cantor Colburn LLP

(57) ABSTRACT

An application and process that incorporates an external heat source to increase the temperature of the airstream entering a compressor section of a combustion turbine. The application and process may perform an anti-icing operation that may not require an Inlet Bleed Heat system (IBH) to operate. Additionally, the application and process may perform an anti-icing operation that may allow for the IGV angle to remain nearly constant. The application and process may increase the output and efficiency of a combustion turbine operating at partload by delaying IBH operation and delaying the closing IGVs.

17 Claims, 4 Drawing Sheets

SYSTEM AND METHOD FOR CHANGING THE EFFICIENCY OF A COMBUSTION TURBINE

BACKGROUND OF THE INVENTION

The present invention relates to the operation of a thermal control system on a combustion turbine, and more particularly to an anti-icing system that uses a heat source located external to the combustion turbine.

Operators of combustion turbines, including aero-derivatives, seek the maximum output and efficiency from the machines. This typically occurs when operating at baseload. During baseload operation the majority of compressed air from the compressor section is combusted; and the inlet guide vanes (IGVs) are full opened, allowing the compressor to drawn in the maximum amount of air from the ambient environment.

To generate additional power from an existing combustion turbine, an inlet air conditioning system is commonly used. The air conditioning system increases the airstream density by lowering the temperature of the airstream entering the compressor section of the combustion turbine. This increases the mass flowrate of the airstream entering the compressor, resulting in increased efficiency and power output of the combustion turbine. An air conditioning system may have the form of, for example, but not limiting of, a chiller system located within an inlet system of the combustion turbine.

However, baseload operation or maximum output from the combustion turbine, though desired by operators, is not always feasible. There may not be a demand in the energy market (electrical grid, or the like) for all of the energy generated at baseload. Here, the combustion turbine must either be shutdown or operate at a partload, where less than the maximum amount of energy is generated. In some energy markets partload operation typically occurs during the evening or nighttime hours, when power demands generally subside.

Some combustion turbines operate in cold, humid ambient environments. These environments can allow ice to form within the inlet system and on components of the compressor section; which may be handful to the combustion turbine. Anti-icing systems are used to prevent or remove this icing. These systems may be a function of an inlet bleed heat system (IBH), which re-circulates hot compressor discharge air to the inlet system, raising the temperature of the inlet airstream. Furthermore, anti-icing systems typically modulate the IGVs to reduce the amount of air entering the compressor section. During anti-icing operation the power and efficiency of the combustion turbine are significantly reduced.

For the foregoing reasons, there is a need for an anti-icing system that does not significantly impact the output and efficiency of the combustion turbine. The system should incorporate an external heat source to increase the temperature of the airstream entering the compressor section. The system should integrate with a pre-existing air conditioning system to increase the airstream temperature.

BRIEF DESCRIPTION OF THE INVENTION

In an accordance with embodiment of the present invention, a system for changing the efficiency of a combustion turbine operating at partload, the system comprising: an inlet system configured for receiving an airstream, the inlet system comprising: an inlet bleed heat (IBH) system and an air conditioning system configured for adjusting a temperature of the inlet air; wherein the airstream enters the air conditioning system at a first temperature and exits the air conditioning system at a second temperature; a combustion turbine comprising a compressor section, wherein the compressor section comprises an inlet guide vane (IGV) system, and wherein the compressor section receives the airstream from the inlet system; and a heat source located to the combustion turbine and integrated with the air conditioning system; wherein the heat source increases the temperature of airstream.

In accordance with an alternate embodiment of the present invention, a method of changing the efficiency of a combustion turbine operating at partload, the method comprising: providing a combustion turbine, wherein the combustion turbine, comprises: an inlet system configured for receiving an airstream, the inlet system comprising: an inlet bleed heat (IBH) system and an air conditioning system configured for adjusting a temperature of the inlet air; a compressor section, wherein the compressor section comprises an inlet guide vane (IGV) system, and wherein the compressor section receives the airstream from the inlet system; and a heat source located to the combustion turbine and integrated with the air conditioning system; wherein the heat source increases the temperature of airstream; determining whether a temperature of the airstream is below a temperature range; and determine whether to operate the air conditioning system to raise the temperature of the airstream above the temperature range.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention may be applied to a wide variety of combustion turbines including, but not limiting of, aero-derivative turbines, and the like. An embodiment of the present invention takes the form of an application and process that incorporates an external heat source to increase the temperature of the airstream entering a compressor section of a combustion turbine. An embodiment of the present invention may perform an anti-icing operation that may not require an IBH system to operate. An embodiment of the present invention may perform an anti-icing operation that may allow for the IGV angle to remain nearly constant. An embodiment of the present invention may increase the output and efficiency of a combustion turbine operating at partload by delaying IBH operation and delaying the closing IGVs.

Figure 1:
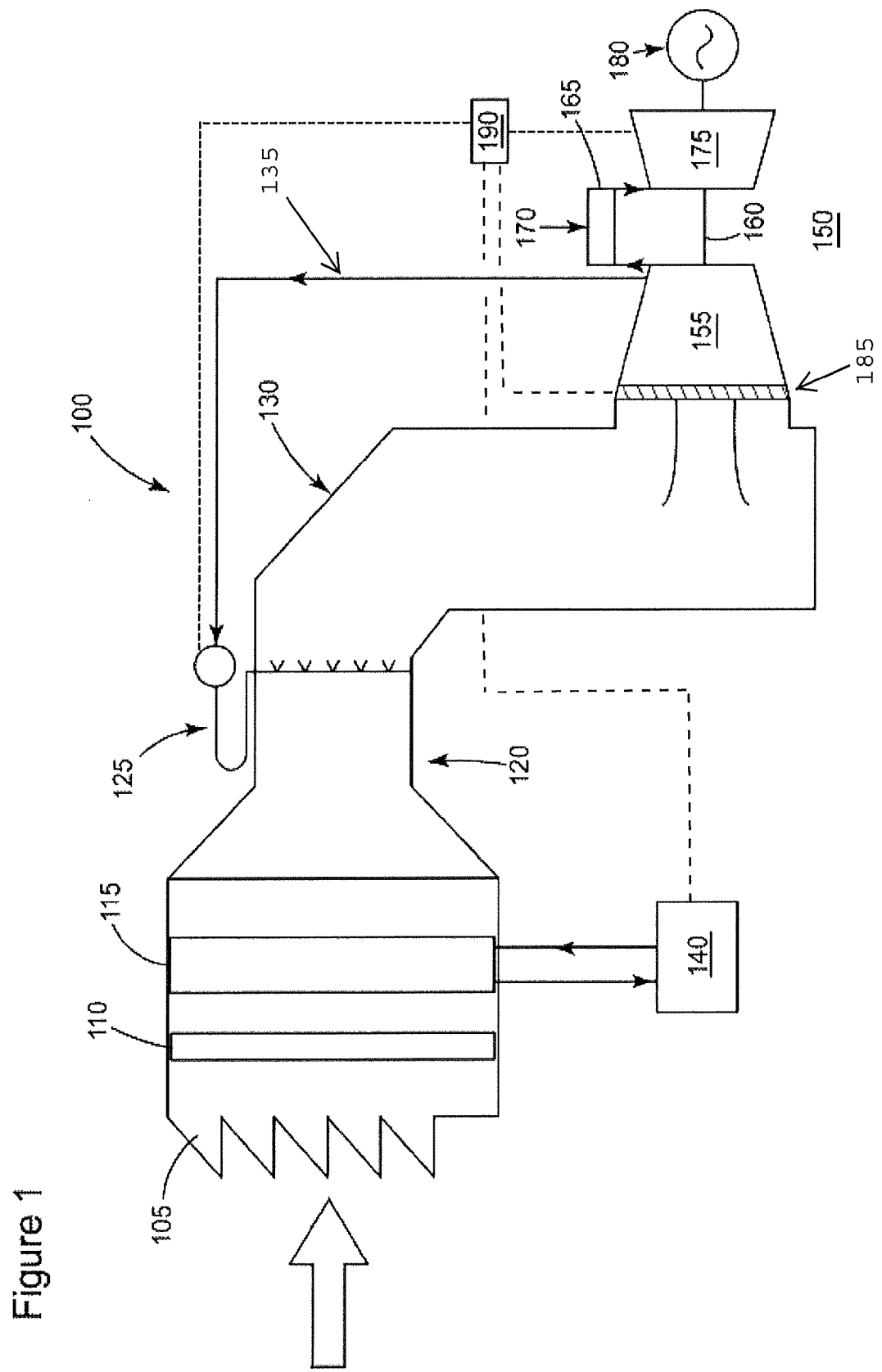
FIG. 1 is a schematic illustrating an example of a system for increasing the efficiency of a combustion turbine in accordance with a first embodiment of the present invention.

Referring now to the Figures, where the various numbers represent like elements throughout the several views, FIG. 1 is a schematic illustrating an example of a system for increasing the efficiency of a combustion turbine 150 in accordance with an embodiment of the present invention. FIG. 1 illustrates a site comprising an inlet system 100; integrated with a combustion turbine 150; and a turbine control system 190.

The inlet system 100 channels the airstream (represented by the arrow pointed towards the inlet system 100) ingested by the compressor section 155. The airstream may derive directly or indirectly from the environment in which the combustion turbine 150 operates. Initially, the airstream flows around a weather hood 105, which may prevent weather elements, such as rain, snow, etc, from entering the compressor section 155. The airstream may then flow through an inlet filter house 110; which generally removes foreign objects and debris from the airstream. Next, the airstream may pass through an air conditioning system 115. Next, the airstream may pass through a transition piece 120 and an inlet duct 130; these components may adjust the velocity and pressure of the airstream, prior to entering the compressor section 155. The airstream may also flow through an IBH system 125. When operating, the IBH system 125 increases the temperature of the airstream by recirculating a portion of the compressor discharge air along a recirculation line 135 and through an IBH heat exchanger, or the like.

The inlet system 100 is generally integrated with the combustion turbine 150; which comprises a compressor section 155, which may include an IGV system 185, a combustion system 165, and a turbine section 175. The airstream generally exits the inlet system 100 and enters the compressor section 155, is compressed and then discharged to a combustion system 165, where a fuel 170, such as natural gas, is burned to provide high-energy combustion gases which drives the turbine section 175. In the turbine section 175, the energy of the hot gases is converted into work, some of which is used to drive the compressor section 155 through the shaft 160, with the remainder available for useful work to drive a load such as the generator 180.

A turbine control system 190 generally controls the operation of the combustion turbine 150 and the inlet system 100 components. The turbine control system 190 may receive operating data on the ambient conditions of the airstream. The operating data may be used to schedule the operation of the IBH system 125.

Figure 2:
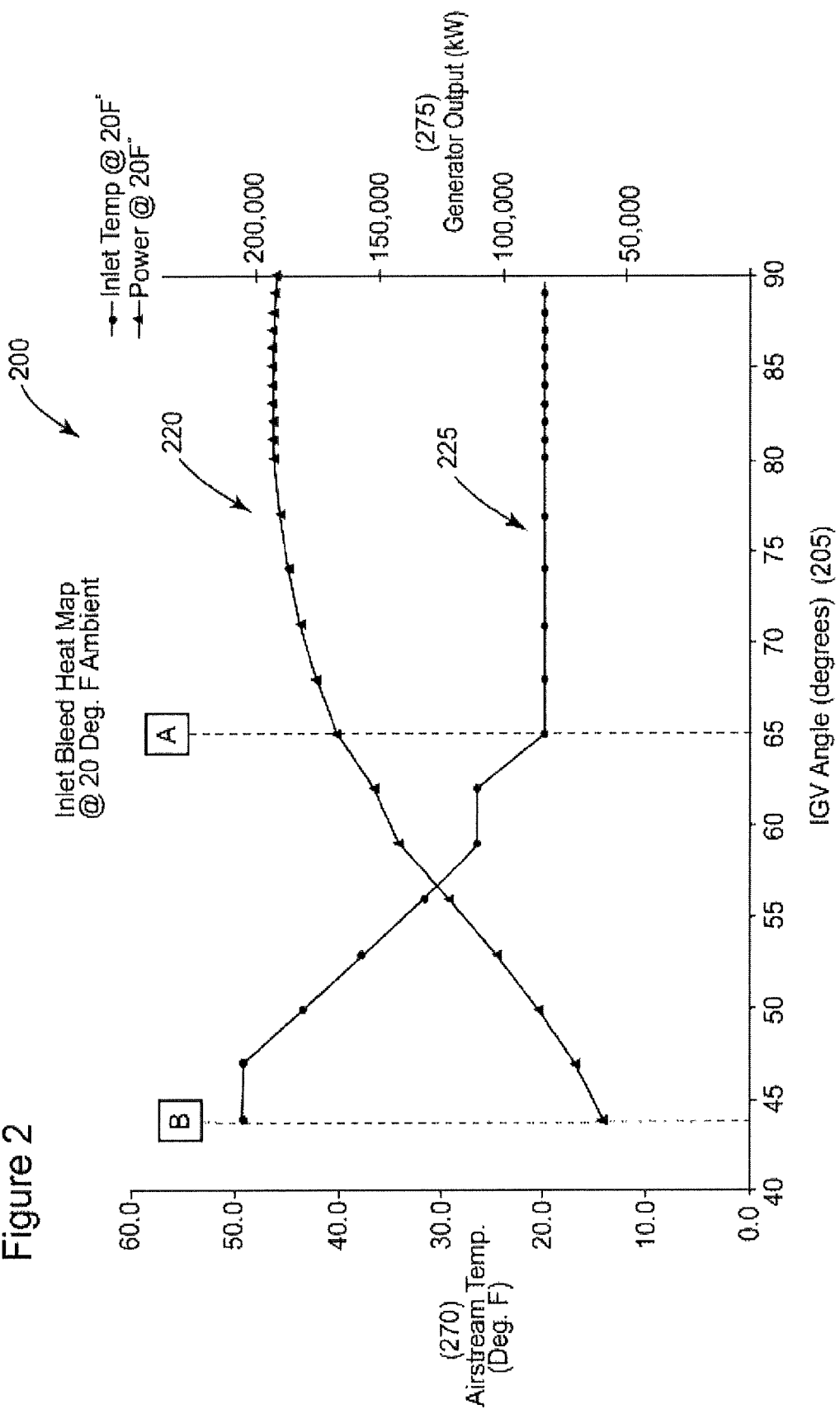
FIG. 2 is a chart illustrating a typical inlet bleed heat map used in anti-icing operations.
Figure 3:
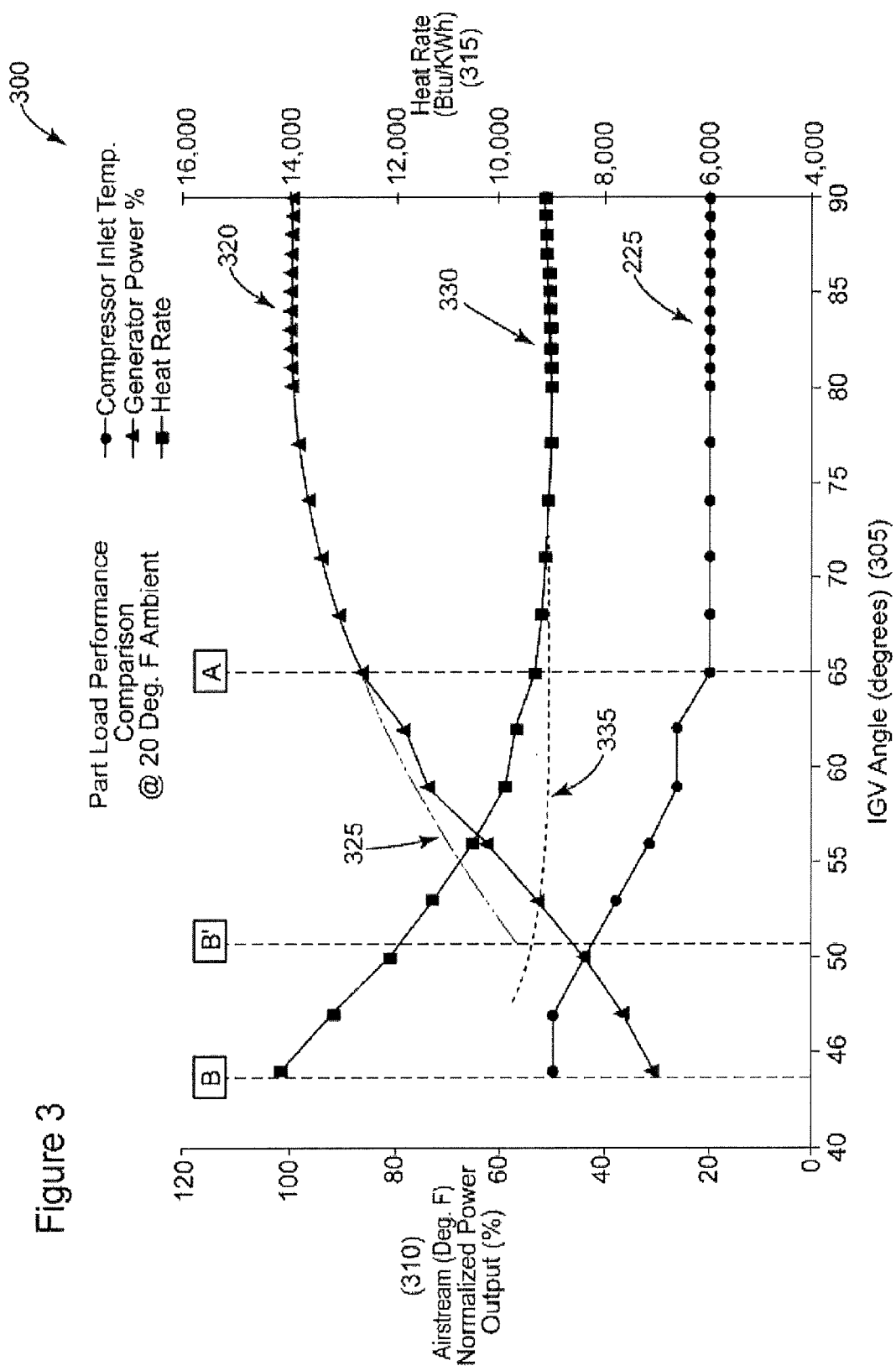
FIG. 3 is a chart illustrating the benefits of an embodiment of the present invention.

For example, but not limiting of, the turbine control system 190 may start the IBH system 125 if the ambient temperature is below approximately 40 Degrees Fahrenheit, and if the airstream temperature is within approximately 10 Degrees Fahrenheit of the airstream dew point temperature. Here, the turbine control system 190 may employ a closed loop control scheme to maintain the airstream temperature approximately 10 Degrees Fahrenheit above the dew point to prevent condensation, which could form ice on surfaces below approximately 32 Degrees Fahrenheit. As illustrated in FIGS. 2 and 3, anti-icing operations employing the IBH system 125 may significantly impact the output and efficiency of the combustion turbine 150.

FIG. 2 is a chart 200 illustrating a typical inlet bleed heat map that may be used by the turbine control system 190 while controlling the IBH system 125 for an anti-icing operation. Specifically, FIG. 2 illustrates a plurality of data when the combustion turbine 150 may be operating at partload when the airstream temperature is approximately 20 Degrees Fahrenheit. In FIG. 2, the x-axis 205 represents an IGV 185 angle, the first y-axis 210 represents an airstream temperature, and the second y-axis represents the output of the generator 180. FIG. 2 illustrates the effect on the output of the combustion turbine 150 that an anti-icing operation may have when employing an IBH system 125.

Data series 225 plots the IGV 185 angle on the x-axis 205 versus an airstream temperature on the first y-axis 210. Here, the chart 200 illustrates that before anti-icing operations, the airstream was approximately 20 Degrees Fahrenheit. Then, when the IGVs 185 are reduced to approximately 65 degrees, the airstream temperature begins to increase, which reflects the effect of the anti-icing operation. This may be considered reference point A (hereinafter "REF_A") and illustrated as 'A' on FIG. 2. Furthermore, when the IGV 185 angle is reduced to approximately 44 degrees, the airstream temperature increases to approximately 50 Degrees Fahrenheit. This may be considered reference point B (hereinafter "REF_B") and illustrated as 'B' on FIG. 2.

Data series 220 plots the IGV 185 angle on the x-axis 205 versus the output of the generator 180 on the second y-axis 215. At REF_A the decrease in output associated with operating the IBH system 125. Specifically, between an IGV 185 angle of 65 and 60 degrees, the output decreases as the IGV 185 angle decreases and as the airstream temperature increases. Furthermore, REF_B illustrates a significant decrease in output by the combustion turbine 150. At REF_A the output is approximately 150 megawatts, and at REF_B the output is approximately 60 megawatts. This decrease in output also translates to a decrease in the efficiency of the combustion turbine 150 while operating at partload.

Referring again to FIG. 1, an embodiment of the present invention may provide an external heat source 140 configured to increase the temperature of the airstream flowing within the inlet system 100. As discussed, the inlet system 100 may comprise an air conditioning system 115, having the form of a chilling system or the like. Typically, the air conditioning system 115 may be used to decrease the temperature of the airstream when the combustion turbine 150 operates in the ambient conditions above a rated temperature range. Typically, the air conditioning system 115 does not operate when ambient condition allows for icing to occur within the inlet system 100 or the combustion section 155.

An embodiment of the present invention integrates an external heat source 140 with the air conditioning system 115 to heat the airstream when the combustion turbine 150 operates in an ambient condition that allows for icing to occur. This may reduce the need to operate the IBH system 125, thereby increasing the efficiency and output of the combustion turbine 150.

The external heat source 140 may be of any form that does not directly receive heat from the combustion turbine 150. For example, but not limiting of, the external heat source 140 may have the form of at least one of: a heat recovery steam generator; a boiler; an engine, a condenser; a power plant component, a solar energy source, geothermal energy source, a fuel cell/chemical reaction, and combinations thereof.

In use, the turbine control system 190 may be integrated with the external heat source 140 to control the heating of the airstream via the air conditioning system 115. An embodiment of the present invention may perform the following steps to perform an anti-icing process on the inlet system 100 and the combustion turbine 150. Determine when the combustion turbine 150 is operating at partload. Determine whether a temperature of the airstream is below a temperature range; and then determine whether to operate the air conditioning system 115 to raise the temperature of the airstream above the temperature range, if required. The turbine control system 190 may also provide a bias that delays the modulation or closing of the IGV system 185 when the air conditioning system 115 operates. The turbine control system 190 may also provide a bias that delays the operation of the IBH system 125 when the air conditioning system 115 operates.

The turbine control system 190 may determine an efficiency of the combustion turbine 150 while control the external heat source 140. This may occur while the turbine control system 190 receives data on: an ambient condition; an output of the heat source. The ambient condition data may include at least one of: an ambient temperature, an ambient pressure, an ambient humidity, or combinations thereof.

As discussed, an embodiment of the present invention may increase the efficiency of a combustion turbine 150 operating at partload. An embodiment of the present invention may delay or avoid the use of the IBH system 125 and also delay or avoid closing the IGVs 185 of the compressor section 155. FIG. 3 is a chart 300 illustrating the benefits of an embodiment of the present invention. Specifically, FIG. 3 illustrates a plurality of data when the combustion turbine 150 may be operating at partload when the airstream temperature is approximately 20 Degrees Fahrenheit. In FIG. 3, the x-axis 305 represents an IGV 185 angle, the first y-axis 310 represents an airstream temperature, and a normalized power output of the combustion turbine 150, and the second y-axis 315 represents the heat-rate of the combustion turbine 150. FIG. 3 includes data series 320, which represents a first generator output, which is similar to data series 220 illustrated in FIG. 2. Furthermore, the reference points A and B of FIG. 2 are similarly positioned in FIG. 3. FIG. 3 also includes the data series 225 of FIG. 2, which illustrates the airstream temperature. FIG. 3 also includes data series 340, which represents the heat-rate of the combustion turbine 150.

FIG. 3 also illustrates improvements to the output and the heat-rate of the combustion turbine 150 when an embodiment of the present invention is employed. Data series 330 may represent a first heat-rate, which is of the combustion turbine 150 operating in a 20 Deg. F. airstream environment. Data series 330 illustrates the effect of operating an anti-icing system using an IBH system 125.

At REF_A the effects of the anti-icing operation using the IBH system 125 starts to become evident. Here, data series 330 illustrates the first heat-rate to be approximately 9.25 BTU/KWH; data series 320 illustrates the normalized power output to be approximately 85%, and data series 225 illustrates the airstream temperature to be approximately 20 Deg. F.

At REF_B the severe operational effects of the anti-icing operation are evident. Here, data series 330 illustrates the first heat-rate to be approximately 14.15 BTU/KWH; data series 320 illustrates the normalized power output to be approximately 31%; and data series 225 illustrates the airstream temperature to be approximately 50 Deg. F.

FIG. 3, also illustrates the benefits to combustion turbine 150 when an embodiment of the present invention provides an external heating source 140 for an anti-icing operation. These benefits may include an increase in power output, represented by data series 325; and a decrease in the heat-rate, represented by data series 335.

FIG. 3 may be used to compare the heat-rate and output of the combustion turbine 150 undergoing anti-icing operations. The anti-icing operations are illustrated with the IBH system 125 used; and when the external energy source 140 is used, as previously described. The first heat-rate may be considered the heat-rate associated with using the IBH system 125 for anti-icing and is represented by data series 330. The second heat-rate may be considered the heat-rate when the IBH system 125 is not used for anti-icing, as previously described, and is represented by data series 335. The first generator output may be considered the output associated with using the IBH system 125 for anti-icing and is represented by data series 320. The second generator output may be considered the heat-rate when the IBH system 125 is not used for anti-icing, as previously described, and is represented by data series 325.

For example, but not limiting of, at reference point B' (hereinafter "REF_B'") and illustrated as "B'" on FIG. 3, the comparison operating data shown in Table 1 is illustrated.

TABLE 1

| | Approximate IGV Angle | Approximate Heat Rate | Approximate Normalized Power Output |
| --- | --- | --- | --- |
| With IBH | 51 | 48% | 11500 btu/kwn |
| Without IBH | 51 | 56% | 9661 btu/kwh |

Figure 4:
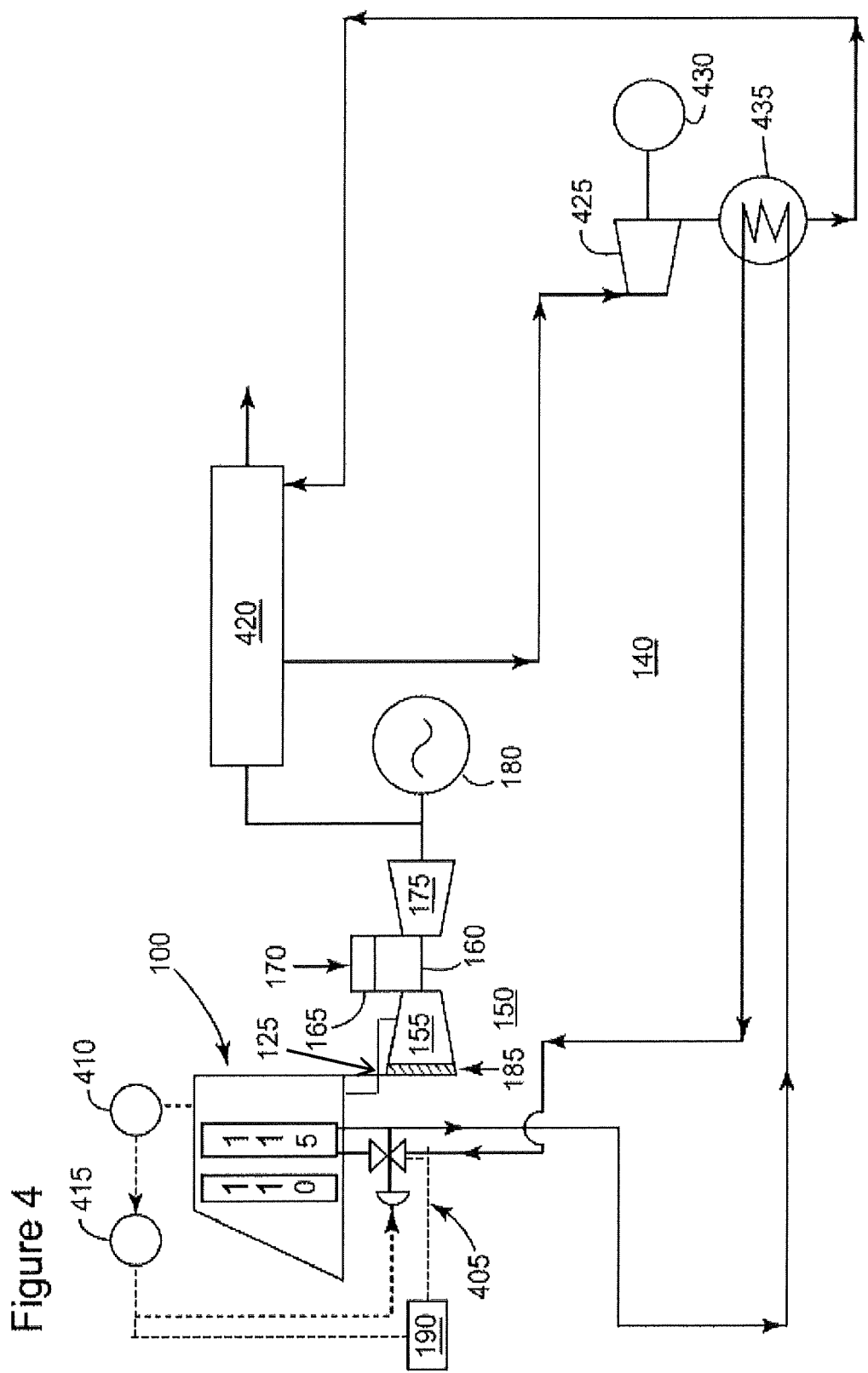
FIG. 4 is a schematic illustrating an example of a system for increasing the efficiency of a combustion turbine in accordance with a second embodiment of the present invention.

FIG. 4 is a schematic illustrating an example of a system for increasing the efficiency of a combustion turbine 150 in accordance with a second embodiment of the present invention. FIG. 4, illustrates the combustion turbine 150 adapted to operate in a combined cycle mode. Here, waste heat exiting the turbine section 175 may flow to a heat recovery steam generator (HRSG) 420, or other the like. The HRSG 420 may create steam from the waste heat. The steam may flow to a steam turbine 425, which may transfer some of the energy in the steam into electricity generated by a second generator 430. This process may cause the steam to condense and the condensate may flow to a condensor 435.

The condensate may become the external heat source 140 integrated with the air conditioning system 115 to prevent anti-icing. In an embodiment of the present invention the condensate may flow through a chilling system of the air conditioning system 115. Here, at least one valve 405 may regulate the flow of the concentrate entering the air conditioning system 115. The condensate may then flow through the air conditioning system 115, heating the airstream flowing over the air conditioning system 115. The airstream temperature, which may be determined by a temperature element 410 and a thermocouple 415, may be used by the turbine control system 190 to determine the position of the valve 405. The condensate may then return to the condensor 435 and return to the HRSG 420, after flowing through the air conditioning system 115.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for changing the efficiency of a combustion turbine operating at partload, the system comprising:
an inlet system configured for receiving an airstream, the inlet system comprising: an inlet bleed heat (IBH) system and an air conditioning system configured for adjusting a temperature of the inlet air; wherein the airstream enters the air conditioning system at a first temperature and exits the air conditioning system at a second temperature, wherein the IBH system is disposed downstream from the air conditioning system, the IBH system comprising a recirculation conduit coupled to a compressor section for recirculating a compressed air to the IBH system;
a combustion turbine comprising a compressor section, wherein the compressor section comprises an inlet guide vane (IGV) system, and wherein the compressor section receives the airstream from the inlet system;
a heat source located external to the combustion turbine and integrated with the air conditioning system; wherein the heat source increases the temperature of the airstream, wherein the heat source comprises at least one of a boiler, a power plant component, a solar energy source, a geothermal energy source, a fuel cell/chemical reaction, and combinations thereof; and
a turbine control system configured to control the air conditioning system and the IGV system to provide a bias that delays a modulation of the IGV system when the air conditioning system operates.

2. The system of claim 1, wherein the air conditioning system reduces the modulation of the IGV system while the combustion turbine operates at partload.

3. The system of claim 1, wherein the air conditioning system reduces use of the IBH system to heat the airstream while the combustion turbine operates at partload.

4. The system of claim 1, wherein the first temperature of the airstream comprises an ambient temperature.

5. The system of claim 1, wherein the air conditioning system comprises a chilling system.

6. The system of claim 5, further comprising at least one valve for controlling the flow of a discharge of the heat source, wherein the at least one valve allows for the discharge to enter the air conditioning system.

7. The system of claim 6, further comprising at least one device that determines an ambient condition, wherein the ambient condition comprises at least one of: an ambient temperature, an ambient pressure, an ambient humidity, or combinations thereof.

8. The system of claim 7, wherein the turbine control system is configured to utilize the ambient condition to control a position of the at least one valve.

9. A method of changing the efficiency of a combustion turbine operating at partload, the method comprising:
providing a combustion turbine, wherein the combustion turbine, comprises:
an inlet system configured for receiving an airstream, the inlet system comprising: an inlet bleed heat (IBH) system and an air conditioning system configured for adjusting a temperature of the airstream, wherein the IBH system is disposed downstream from the air conditioning system, the IBH system comprising a recirculation conduit coupled to a compressor section for recirculating a compressed air to the IBH system;
a compressor section, wherein the compressor section comprises an inlet guide vane (IGV) system, and wherein the compressor section receives the airstream from the inlet system; and
a heat source located external to the combustion turbine and integrated with the air conditioning system; wherein the heat source increase the temperature of the airstream, wherein the heat source comprises at least one of a boiler, a power plant component, a solar energy source, a geothermal energy source, a fuel cell/chemical reaction, and combinations thereof;
determining whether a temperature of the airstream is below a first temperature;
determine whether to operate the air conditioning system to raise the temperature of the airstream above the first temperature;
controlling the heat source to raise the temperature above the first temperature; and
delaying a modulation of the IGV system when the air conditioning system operates.

10. The method according to claim 9, further comprising delaying the operation of the IBH when the air conditioning system operates.

11. The method according to claim 9, utilizing a chilling system to serve as the air conditioning system.

12. The method according to claim 9, further comprising utilizing the turbine control system to determine the efficiency of the combustion turbine, wherein the turbine control system receives data on: an ambient condition; an output of the heat source.

13. The method according to claim 12, further comprising receiving ambient condition data on at least one of: an ambient temperature, an ambient pressure, an ambient humidity or combinations thereof.

14. The method according to claim 13, wherein the combustion turbine further comprises providing at least one valve for allowing a discharge of the heat source to increase the temperature of the airstream flowing through the air conditioning system.

15. The method according to claim 14, further comprising utilizing the turbine control system to stroke the at least one valve.

16. The method according to claim 15, wherein the turbine control system operates the air conditioning system to maintain the airstream temperature between the first temperature and a second temperature.

17. The method according to claim 16, wherein the turbine control system utilizes the IBH system to maintain the airstream temperature between the first temperature and the second temperature.

* * * * *